(12) United States Patent
Takahashi

(10) Patent No.: US 9,545,885 B2
(45) Date of Patent: Jan. 17, 2017

(54) IN-VEHICLE MICROPHONE APPARATUS

(71) Applicant: Kojima Industries Corporation, Toyota-shi, Aichi (JP)

(72) Inventor: Kazuki Takahashi, Toyota (JP)

(73) Assignee: KOJIMA INDUSTRIES CORPORATION, Toyota-shi, Aichi (JP)

( * ) Notice: Subject to any disclaimer, the term of this patent is extended or adjusted under 35 U.S.C. 154(b) by 0 days.

(21) Appl. No.: 14/932,332

(22) Filed: Nov. 4, 2015

(65) Prior Publication Data
US 2016/0152192 A1    Jun. 2, 2016

(30) Foreign Application Priority Data

Dec. 1, 2014 (JP) .................................. 2014-243166

(51) Int. Cl.
*H04R 1/02* (2006.01)
*B60R 11/02* (2006.01)
*H04R 1/04* (2006.01)

(52) U.S. Cl.
CPC ............ *B60R 11/0247* (2013.01); *H04R 1/04* (2013.01); *H04R 2499/13* (2013.01)

(58) Field of Classification Search
CPC ............... H04R 5/02; H04R 9/06; H04R 1/02; H04R 1/105; H04R 1/08; H04R 1/025; H04R 1/026
USPC .................. 381/302, 334–336, 365, 386, 389
See application file for complete search history.

(56) References Cited

U.S. PATENT DOCUMENTS

| | | | | |
|---|---|---|---|---|
| 7,769,196 | B2* | 8/2010 | Wang | H04R 1/08 381/365 |
| 8,009,852 | B2* | 8/2011 | Gratke | H04R 1/086 381/365 |
| 8,090,138 | B2* | 1/2012 | Toyama | B60R 11/0223 381/365 |
| 2005/0236224 | A1 | 10/2005 | Mizoguchi et al. | |
| 2011/0158450 | A1 | 6/2011 | Tanaka et al. | |

(Continued)

FOREIGN PATENT DOCUMENTS

JP     2005306278 A    11/2005
JP     2009188943 A     8/2009

(Continued)

OTHER PUBLICATIONS

Japanese Notice of Grounds for Rejection corresponding to Application No. 2014-243166; Date of Mailing: Sep. 20, 2016, with English translation.

*Primary Examiner* — Suhan Ni
(74) *Attorney, Agent, or Firm* — Cantor Colburn LLP

(57) ABSTRACT

An in-vehicle microphone apparatus includes one or more microphone elements having a diaphragm and converting a vibration received by the diaphragm into an electric signal, an acoustic retainer retaining the one or more microphone elements and having an end surface provided with a plurality of sound collection ports, a bezel attached to the end surface of the acoustic retainer and having a plurality of through-holes formed at positions directly facing the plurality of the sound collection portion, and lips disposed on one of the bezel and the acoustic retainer and coming into close contact with the other at a position surrounding each of the plurality of the sound collection ports so as to fill the gap between the bezel and the acoustic retainer.

4 Claims, 8 Drawing Sheets

(56) References Cited

U.S. PATENT DOCUMENTS

2011/0158453 A1 6/2011 Tanaka et al.
2012/0300969 A1 11/2012 Tanaka et al.

FOREIGN PATENT DOCUMENTS

| JP | 2009-208493 A | 9/2009 |
| JP | 2011114506 A | 6/2011 |
| JP | 2011120018 A | 6/2011 |
| JP | 2011120021 A | 6/2011 |
| JP | 2011155450 A | 8/2011 |
| JP | 2013244905 A | 12/2013 |

* cited by examiner

IN-VEHICLE MICROPHONE APPARATUS

PRIORITY INFORMATION

The present invention claims priority under 35 U.S.C. §119 to Japanese Application No. 2014-243166, filed on Dec. 1, 2014, the entire content of which is incorporated herein by reference.

TECHNICAL FIELD

The present invention relates to an in-vehicle microphone apparatus assembled in a vehicle interior.

BACKGROUND ART

An in-vehicle microphone apparatus mounted within a vehicle interior, for example, in a vehicle interior ceiling is conventionally widely known. A voice collected by the in-vehicle microphone apparatus is used for operation of in-vehicle devices (e.g., a car navigation apparatus) etc.

In a vehicle interior, various noise sounds are generated along with a user's speech sound (i.e., a target sound to be collected), including an engine sound, a sound of tires during running, and a wind sound. To accurately collect the target sound from such noise sounds, a directional microphone is often used for limiting a direction of picking up a sound (e.g., Japanese Laid-Open Patent Publication No. 2005-306278).

However, a conventional in-vehicle microphone has an unintended gap generated in the middle of a passage of sound going to a microphone element, and the target sound and the noise sounds cannot be separated in some cases. This will be described with reference to FIGS. 7 and 8.

FIG. 7 is a schematic configuration diagram of a conventional in-vehicle microphone apparatus 10 and FIG. 8 is a perspective view of an acoustic retainer 14 used in the in-vehicle microphone apparatus 10. This in-vehicle microphone apparatus 10 is assembled on a ceiling surface 100 of a vehicle interior and includes a microphone element 12, an acoustic retainer 14 retaining the microphone element 12, and a bezel 16 assembled on an end surface of the acoustic retainer 14. The microphone element 12 is disposed with a diaphragm 18 vibrating by receiving a sound and an electric circuit (not depicted) converting the vibration of the diaphragm into an electric signal. On the front side (the lower side on the plane of FIG. 7) of the diaphragm 18, a delay passage 20 is disposed that delays arrival of sound at the diaphragm 18.

The acoustic retainer 14 is provided with a first sound passage 22a guiding a sound to the back side of the diaphragm 18 and a second sound passage 22b guiding a sound to the front side of the diaphragm 18. End portions of the first sound passage 22a and the second sound passage 22b form a first sound collection port 24a and a second sound collection port 24b acting as inlet ports for sound. The first sound collection port 24a and the second sound collection port 24b are located on a directivity direction (target sound utterance direction) side and a side opposite to the directivity direction, respectively, in the end surface of the acoustic retainer 14. The bezel 16 is attached to the end surface of the acoustic retainer 14 to enhance the design of the in-vehicle microphone apparatus 10. The bezel 16 has a first through-hole 30a and a second through-hole 30b formed at positions directly facing the first sound collection port 24a and the second sound collection port 24b.

A sound generated at a position opposite to the directivity direction, i.e., a portion constituting noise, goes through the first through-hole 30a, the first sound collection port 24a, and the first sound passage 22a and arrives at a back surface of the diaphragm 18, and another portion of the sound constituting noise goes through the second through-hole 30b, the second sound collection port 24b, the second sound passage 22b, and the delay passage 20 and arrives at a front surface of the diaphragm 18. The in-vehicle microphone apparatus 10 has sound path lengths adjusted such that the noise arrives at the front surface and the back surface of the diaphragm 18 at the same time. Since the noise arriving at the front surface and the back surface of the diaphragm 18 at the same time cancel out each other, the removal of the noise is achieved.

However, the bezel 16 of the conventional in-vehicle microphone apparatus 10 has a configuration coming into close contact only with a periphery of the acoustic retainer 14. Therefore, as depicted in FIG. 8, the conventional acoustic retainer 14 has a lip formed at the periphery for the close contact with the bezel 16. However, no lip exists that separates the first sound collection port 24a and the second sound collection port 24b. Thus, if the bezel 16 is brought into close contact with the acoustic retainer 14, a gap arises that allows the first sound collection port 24a and the second sound collection port 24b to communicate with each other between the acoustic retainer 14 and the bezel 16. As a result, this may cause a sound that should originally arrive at the back surface of the diaphragm 18 to go to the front surface of the diaphragm 18, or conversely cause a sound that should arrive at the front surface of the diaphragm 18 to go to the back surface of the diaphragm 18. Consequently, the sounds constituting noise cannot be properly canceled out and the target sound and the noise cannot clearly be separated.

SUMMARY OF THE INVENTION

It is therefore an object of the present invention to provide an in-vehicle microphone apparatus capable of more clearly separating the target sound and the noise.

An in-vehicle microphone apparatus of the present invention is an in-vehicle microphone apparatus assembled in a vehicle interior and includes one or more microphone elements having a diaphragm and converting a vibration received by the diaphragm into an electric signal, an acoustic retainer retaining the one or more microphone elements and having an end surface provided with a plurality of sound collection ports acting as inlet ports for sound going to the diaphragm, a bezel attached to the end surface of the acoustic retainer and having a plurality of through-holes formed at positions directly facing the plurality of the sound collection ports, and a close-contact member disposed on one of the bezel and the acoustic retainer and abutting on, and elastically deforming to be in close contact with, the other of the bezel and the acoustic retainer at a position surrounding each of the plurality of the sound collection ports so as to fill the gap between the bezel and the acoustic retainer.

In a preferred aspect, the close-contact member is a lip becoming thinner toward the other of the bezel and the acoustic retainer. In this case, it is desirable that the acoustic retainer is provided with a first sound collection port and a second sound collection port adjacent to each other, that the bezel is provide with a first through-hole directly facing the first sound collection port and a second through-hole directly facing the second sound collection port, and that the close-contact member includes a peripheral lip that is disposed on a peripheral edge of the acoustic retainer and that elastically deforms to be in close contact with the bezel, and a center lip that is disposed between the first sound collection port and the second sound collection port on the end surface of the acoustic retainer to extend from one side of the peripheral lip to another side opposite to the one side and that elastically deforms to be in close contact with the bezel.

In this case, it is desirable that the acoustic retainer is further provided with a first sound passage communicating with the first sound collection port, a second sound passage communicating with the second sound collection port, a partition wall separating the first sound passage and the second sound passage and having a tip acting as a center lip, a communicating port that is an opening penetrating the partition wall and that allows communication between the first sound passage and the second sound passage, and that the partition wall has a thicker portion between the communicating port and the bezel compared to the other portion.

According to the present invention, since the close-contact member is disposed at a position surrounding each of the plurality of the sound collection ports, a sound can be effectively prevented from flowing to an unintended path and the target sound and the noise can be clearly separated.

MODE FOR CARRYING OUT THE INVENTION

Figure 1:
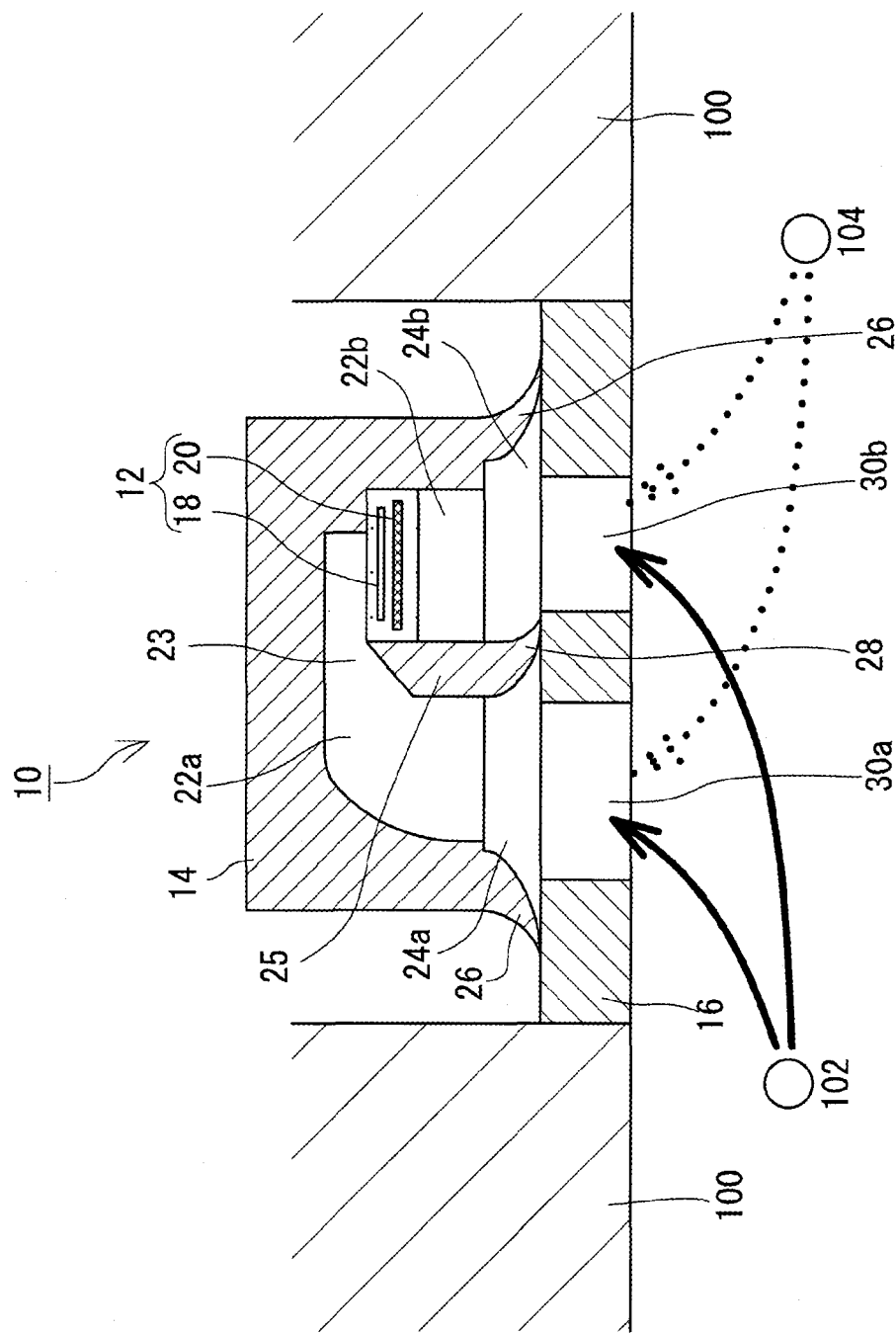
FIG. 1 is a diagram of a configuration of an in-vehicle microphone apparatus that is an embodiment of the present invention.
Figure 2:
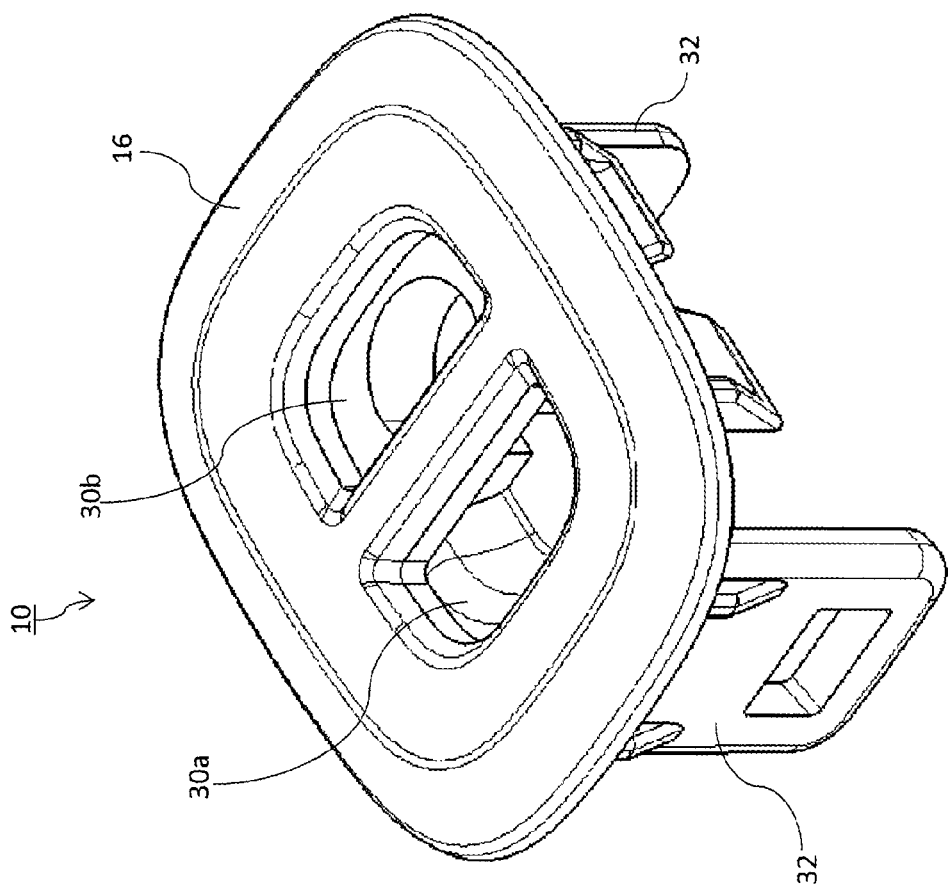
FIG. 2 is a perspective view of the in-vehicle microphone apparatus.
Figure 3:
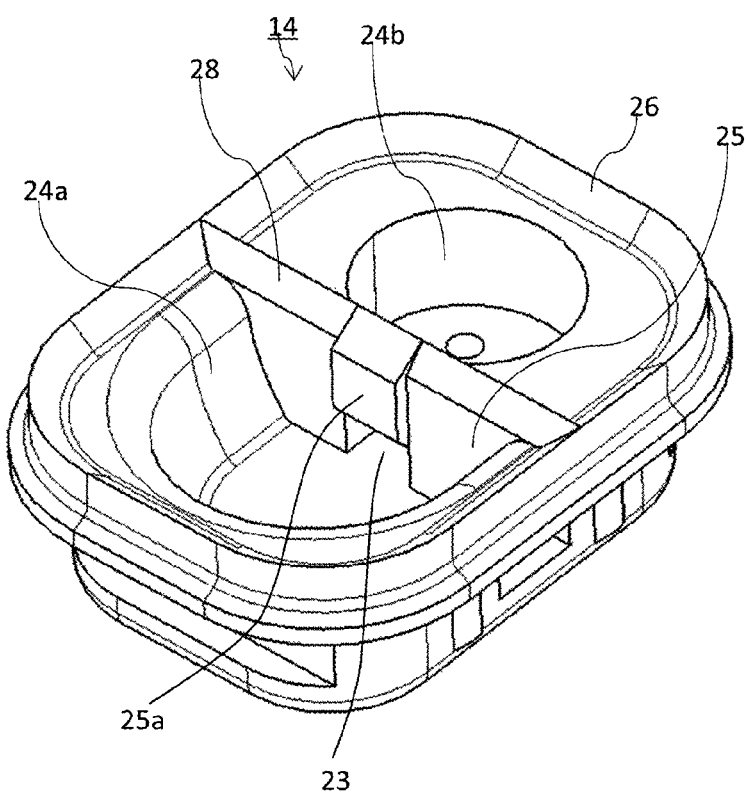
FIG. 3 is a perspective view of an acoustic retainer.

An embodiment of the present invention will now be described with reference to the drawings. FIG. 1 is a schematic configuration diagram of an in-vehicle microphone apparatus 10 that is an embodiment of the present invention. FIG. 2 is a perspective view of the in-vehicle microphone apparatus 10 and FIG. 3 is a perspective view of an acoustic retainer 14.

In this embodiment, an in-vehicle microphone apparatus 10 disposed on a ceiling surface 100 in a vehicle interior is taken as an example to describe this in-vehicle microphone apparatus 10. The present invention is not limited to the in-vehicle microphone apparatus 10 disposed on the ceiling surface 100 in a vehicle interior and is also applicable to an in-vehicle microphone apparatus disposed other than on the ceiling surface 100 in a vehicle interior, for example, in an instrument panel, for collecting a voice of an occupant in a vehicle interior.

The in-vehicle microphone apparatus 10 includes a microphone element 12, an acoustic retainer 14 retaining the microphone element 12, and a bezel 16 attached to an end surface of the acoustic retainer 14. The microphone element 12 is an element converting a collected sound into an electric signal and includes a diaphragm 18 that is vibrated by receiving a sound, an electric circuit (not depicted) converting the vibration of the diaphragm 18 into an electric signal, and a delay passage 20 delaying arrival of sound at the diaphragm 18, etc. In the following description, the vehicle interior side (the lower side of FIG. 1) of the microphone element 12 is referred to as a "front side" and the vehicle exterior side (the upper side of FIG. 1) is referred to as a "back side". A front surface of the diaphragm 18 is in communication with a second sound passage 22b described later and a back surface of the diaphragm 18 is in communication with a first sound passage 22a. On the front surface side of the diaphragm 18, the delay passage 20 is disposed for delaying arrival of sound at the front surface side. This delay passage 20 is made of a plurality of plate materials etc., diverting the sound from the first sound passage 22a, for example.

The acoustic retainer 14 is a substantially box-shaped member retaining the microphone element 12. The acoustic retainer 14 is made of a material with excellent elasticity such as elastomer, and the whole part thereof is a one-piece molding consisting of a single component. The acoustic retainer 14 is disposed with the first sound passage 22a communicating with the back side of the microphone element 12 and the second sound passage 22b communicating with the front side of the microphone element 12. A starting end of the first sound passage 22a is the first sound collection port 24a, and a starting end of the second sound passage 22b is the second sound collection port 24b. The first sound collection port 24a is disposed at a position on the end surface of the acoustic retainer 14 closer to a target sound source 102 (left side of FIG. 1), and the second sound collection port 24b is disposed at a position on the end surface of the acoustic retainer 14 closer to a noise sound source 104 distant from the target sound source 102 (right side of FIG. 1).

The first sound passage 22a and the second sound passage 22b are separated by a partition wall 25, and a communication port 23 allowing communication between the both sound passages 22a and 22b is formed at the lower end center of the partition wall 25. The microphone element 12 is disposed in the second sound collection port 24b. The diameter of the microphone element 12 is the same as or slightly larger than the diameter of the second sound collection port 24b. The microphone element 12 is fixed by press-fitting the microphone element 12 into the second sound collection port 24b while elastically deforming the second sound collection port 24b. The first sound passage 22a including the communication port 23 is a passage bent into a substantially L shape in cross section, and the sound traveling from the first sound collection port 24a to the first sound passage 22a takes a detour and arrives at the back side of the microphone element 12. The second sound passage 22b is a passage extending substantially straight from the end surface of the acoustic retainer 14 to the front side of the microphone element 12, and the sound traveling from the second sound collection port 24b to the second sound passage 22b arrives at the front side of the microphone element 12 in a relatively short time.

The end surface of the acoustic retainer 14 is provided with lips 26, 28 that are close-contact members coming into close contact with the bezel 16 to fill a gap between the bezel 16 and the acoustic retainer 14. The lips 26, 28 have a substantially triangular shape cross section, with a width becoming narrower toward the bezel 16, and is elastically deformed by a relatively small force. The lips are broadly classified into the peripheral edge lip 26 and the center lip 28. The peripheral edge lip 26 is disposed on the peripheral edge of the acoustic retainer 14 and elastically deforms to be in close contact with the bezel 16. The center lip 28 is disposed between the first sound collection port 24a and the second sound collection port 24b, i.e., at a tip of the partition wall 25, and extends from one side of the peripheral edge lip 26 to another side opposite to the one side. Therefore, the periphery of the first sound collection port 24a is surrounded by a portion of the peripheral edge lip 26 and the center lip 28, and the periphery of the second sound collection port 24b is surrounded by the other portion of the peripheral edge lip 26 and the center lip 28. As is apparent from FIG. 3, in the partition wall 25 including the center lip 28, a portion between the communication port 23 and the bezel 16 is formed thicker compared to the other portion. This is because the thicker portion tends to have poor rigidity due to formation of the communication port 23.

The bezel 16 is attached to the end surface of the acoustic retainer 14. The bezel 16 is a substantially flat plate member having a shape corresponding to the acoustic retainer 14 and makes up a portion of the vehicle interior ceiling surface 100. A plurality of bars 32 are disposed to extend from the peripheral edge of the bezel 16 toward the acoustic retainer 14 (see FIG. 2). Convex or concave portions (not depicted) disposed on the bars 32 and concave or convex portions disposed on side surfaces of the acoustic retainer 14 are engaged with each other to attach the bezel 16 to the acoustic retainer 14. The bezel 16 has a first through-hole 30a formed at a position directly facing the first sound collection port 24a and a second through-hole 30b formed at a position directly facing the second sound collection port 24b. Although the acoustic retainer 14 is attached to the ceiling surface 100 via the bezel 16 in this embodiment, the acoustic retainer 14 may be attached to the ceiling surface via a panel surface such as an overhead panel instead of the bezel 16. The bezel 16 may further be covered by another design panel etc., such that the bezel 16 cannot be seen from the vehicle interior.

The operation of the in-vehicle microphone apparatus 10 will be described. Description will first be given of the case of collecting a sound from the directivity direction, i.e., a sound (target sound) from the target sound source 102. A portion of the target sound goes through the first through-hole 30a, the first sound collection port 24a, and the first sound passage 22a to the back side of the microphone element 12. Another portion of the target sound goes through the second through-hole 30b, the second sound collection port 24b, and the second sound passage 22b to the front side of the microphone element 12. As described above, although the route through the first sound passage 22a is longer than the route through the second sound passage 22b, the route through the first sound passage 22a is disposed at a position closer to the target sound source 102. As a result, the sound generated from the target sound source 102 arrives at the back side of the microphone element 12 through the first sound passage 22a etc., at almost the same time as when the sound arrives at the front side of the microphone element 12 through the second sound passage 22b etc. However, the front side of the microphone element 12 is disposed with the delay passage 20 delaying the arrival of sound at the diaphragm 18. Therefore, the arrival time of the target sound through the second sound passage 22b at the diaphragm 18 becomes later than that of the target sound through the first sound passage 22a. Thus, since the target sounds arrive at the front surface and the back surface of the diaphragm 18 with a temporal difference, the target sounds are not cancelled out by each other at the diaphragm 18 and the target sounds can be properly collected.

Description will be given of the case of collecting a sound from the side opposite to the directivity direction, i.e., a sound (noise sound) from the noise source 104. As is the case with the target sound, a portion of the noise goes through the first through-hole 30a, the first sound collection port 24a, and the first sound passage 22a to the back side of the microphone element 12. Another portion of the noise goes through the second through-hole 30b, the second sound collection port 24b, and the second sound passage 22b to the front side of the microphone element 12. The route through the second sound passage 22b is shorter than the route through the first sound passage 22a and is closer to the noise source. Therefore, the noise sound arrives at the front side of the microphone element 12 through the second sound passage 22b etc., earlier than the time when the noise arrives at the back side of the microphone element 12 through the first sound passage 22a etc. However, the front side of the microphone element 12 is disposed with the delay passage 20 delaying the arrival of sound at the diaphragm 18. Therefore, since the noise through the second sound passage 22b etc. goes through the delay passage 20, the noise through the second sound passage 22b etc. arrives at the front surface of the diaphragm 18 almost at the same time as when the noise through the first sound passage 22a arrives at the back surface of the diaphragm 18. Thus, since the noise arrive at the front surface and the back surface of the diaphragm 18 at almost the same time, the noise sounds are cancelled out by each other at the diaphragm 18 and the noise is removed.

As is apparent from the above description, in this embodiment, the routes of sounds are adjusted in advance to control the arrival times of the sounds at the diaphragm 18, thereby separating the noise and the target sound. In other words, if the sounds go through routes that are not set, the arrival times of the sounds cannot be controlled and the noise and the target sound cannot properly be separated.

Figure 7:
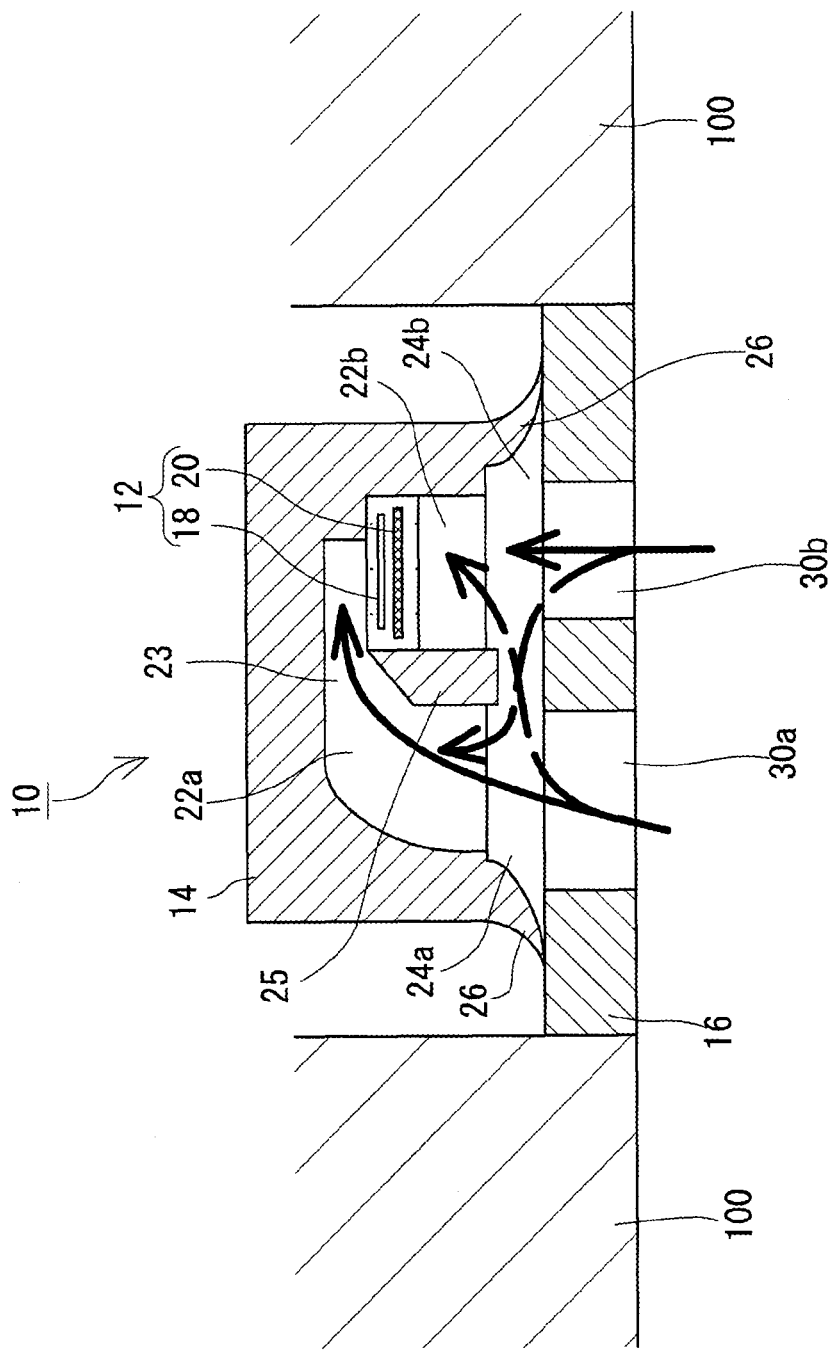
FIG. 7 is a diagram of a configuration of a conventional in-vehicle microphone apparatus.
Figure 8:
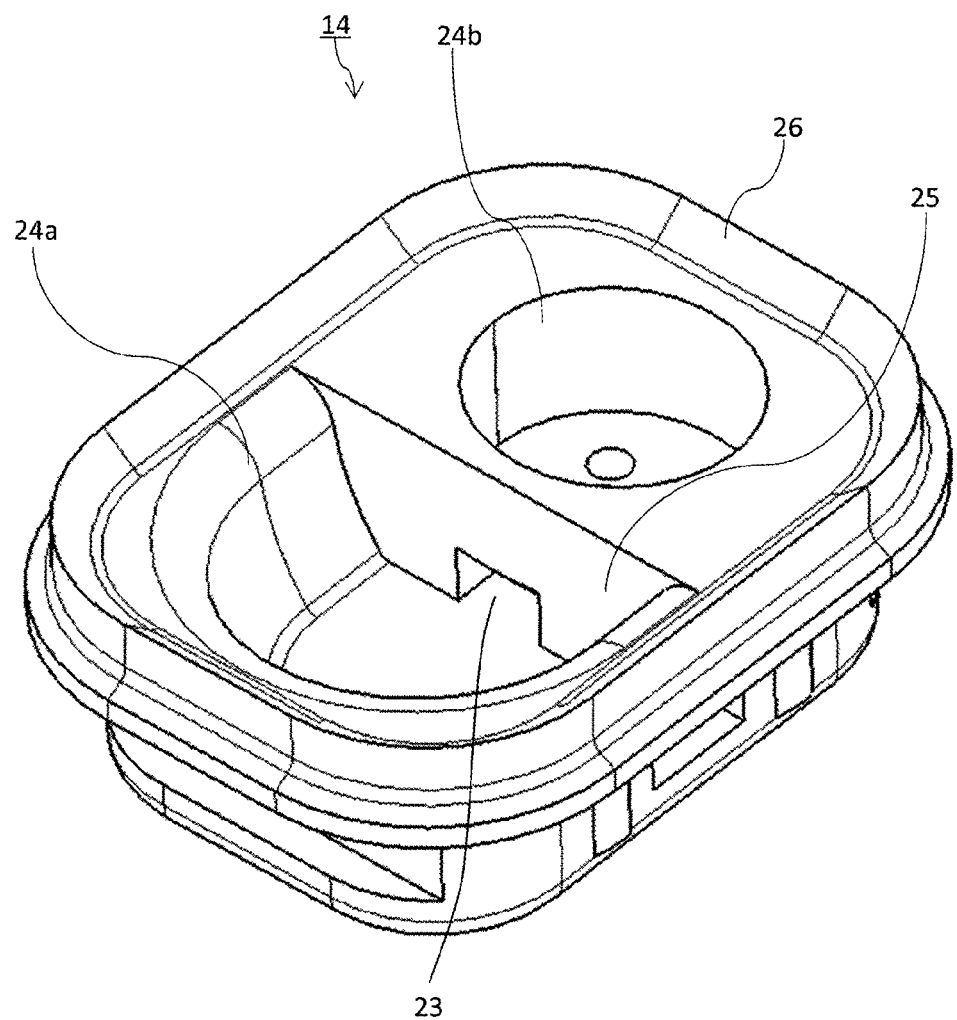
FIG. 8 is a perspective view of a conventional acoustic retainer.

However, as depicted in FIGS. 7 and 8, the center lip 28 is not disposed on the acoustic retainer 14 in the conventional in-vehicle microphone apparatus 10. Therefore, a gap arises that allows the first sound collection port 24a and the second sound collection port 24b to communicate with each other between the bezel 16 and the acoustic retainer 14. As a result, the sound entering from the first through-hole 30a flows into the second sound passage 22b, and the sound entering from the second through-hole 30b flows into the first sound passage 22a. Thus, the conventional in-vehicle microphone apparatus 10 allows a portion of sound to go through a route that is not set, and cannot properly separate the noise and the target sound.

On the other hand, in this embodiment, as described above, the center lip 28 is disposed in addition to the peripheral edge lip 26. Therefore, the gap between the first sound collection port 24a and the second sound collection port 24b is filled and the first sound collection port 24a and the second sound collection port 24b are completely blocked from each other. As a result, an unintended sound flow can be prevented and the noise and the target sound can be properly separated.

Figure 4A:
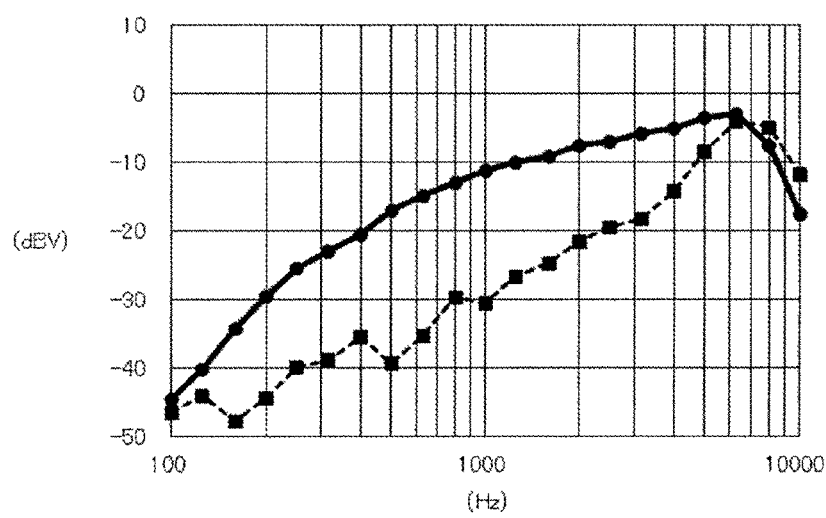
FIG. 4A is a diagram of a result of a sound collection experiment with the microphone apparatus of this embodiment.
Figure 4:
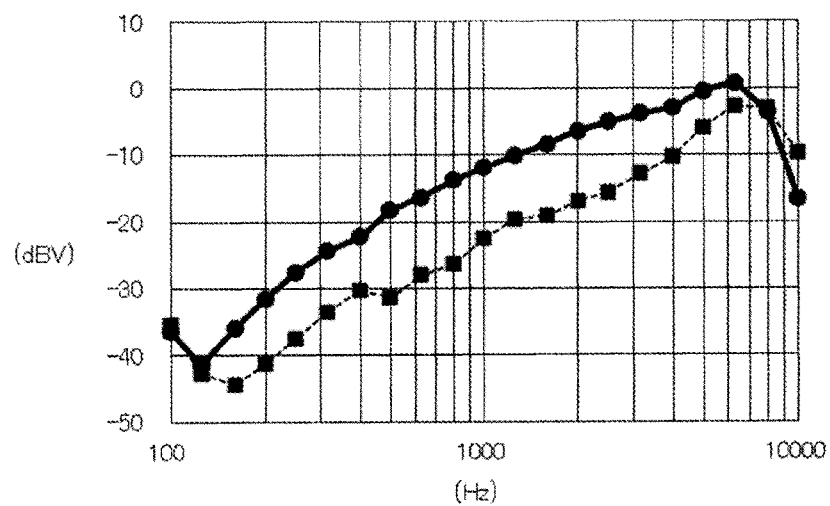
FIG. 4B is a diagram of a result of a sound collection experiment with a conventional microphone apparatus.

FIGS. 4A and 4B depict results of sound collection experiments and FIG. 4A is a graph of a sound collection experiment result of the in-vehicle microphone apparatus 10 of this embodiment while FIG. 4B is a graph of a sound collection experiment result of the conventional in-vehicle microphone apparatus 10. In FIGS. 4A and 4B, a solid line indicates a sound collection level of the target sound, and a broken line indicates a sound collection level of the noise.

As is apparent from the comparison results of FIGS. 4A and 4B, according to this embodiment, a level of the noise relative to the target sound can be significantly reduced compared to the conventional technique. As a result, the effect of the noise sound can be reduced and the target sound can be clearly collected.

Figure 5:
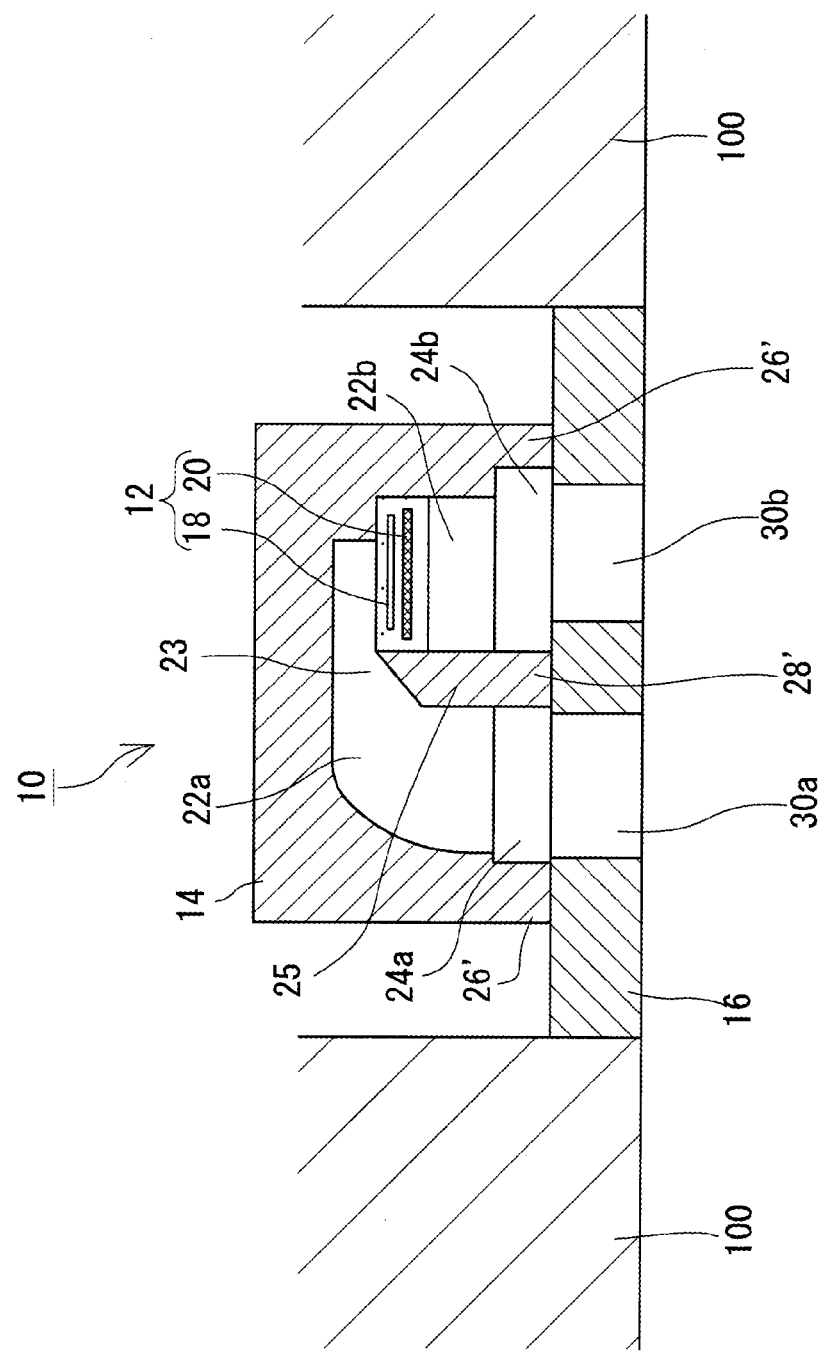
FIG. 5 is a diagram of an example of another in-vehicle microphone apparatus.

Although the lips 26, 28 are disposed on the acoustic retainer 14 in this embodiment, the lips may be disposed on the bezel 16 as long as the gap between the acoustic retainer 14 and the bezel 16 is filled. The shape of the lips is not limited to triangular lips having a cross section in a substantially triangular shape as long as the lips can come into close contact with the opposite member (the bezel 16 or the acoustic retainer 14) and may be rectangular lips 26', 28' having a cross section in a rectangular shape as depicted in FIG. 5.

Figure 6:
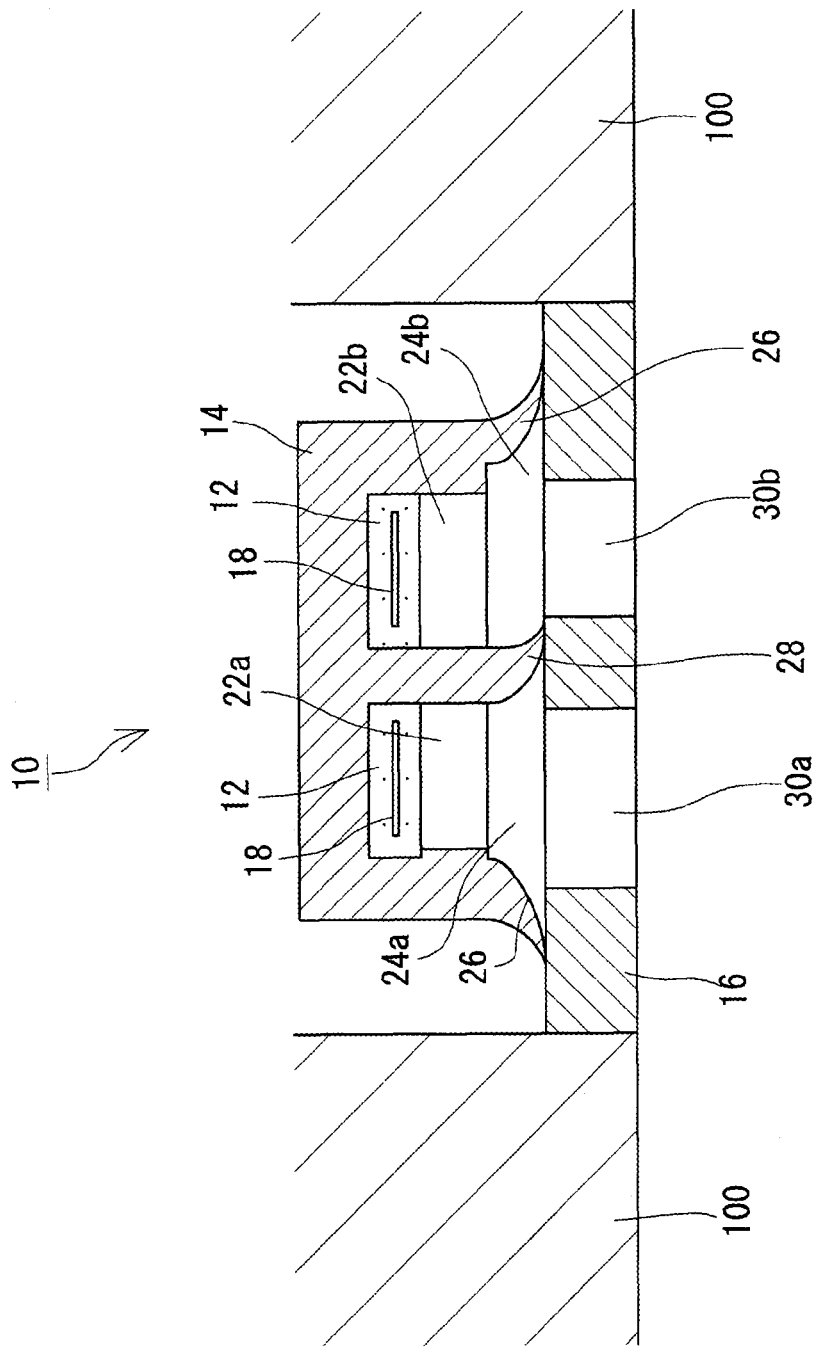
FIG. 6 is a diagram of an example of a further in-vehicle microphone apparatus.

Although the case of using the directional microphone element 12 is exemplified in this embodiment, the present invention may be applied to a structure executing a signal process by using a plurality of non-directional microphone elements. For example, as depicted in FIG. 6, the acoustic retainer 14 maybe disposed with pluralities of (in the depicted example, two each of) the sound passages 22a, 22b and the sound collection ports 24a, 24b, and each of the sound passages 22a, 22b may be disposed with one non-directional microphone element 12. Also in this case, the sound path lengths can be properly managed and the desired sound can be properly extracted by disposing the close-contact members (the lips 26, 28) to surround the peripheries of the sound collection ports 24a, 24b. Although the microphone element 12 includes two each of the sound passages 22a, 22b and the sound collection ports 24a, 24b in FIG. 6, the numbers thereof may be larger.

The invention claimed is:

1. An in-vehicle microphone apparatus assembled in a vehicle interior comprising:
    one or more microphone elements having a diaphragm and converting a vibration received by the diaphragm into an electric signal;
    an acoustic retainer retaining the one or more microphone elements and having an end surface provided with a plurality of sound collection ports acting as inlet ports for sound going to the diaphragm;
    a bezel attached to the end surface of the acoustic retainer and having a plurality of through-holes formed at positions directly facing the plurality of the sound collection ports; and
    a close-contact member disposed on one of the bezel and the acoustic retainer and abutting on and elastically deforming to be in close contact with the other of the bezel and the acoustic retainer at a position surrounding each of the plurality of the sound collection ports so as to fill the gap between the bezel and the acoustic retainer.

2. The in-vehicle microphone apparatus of claim 1, wherein the close-contact member is a lip becoming thinner toward the other of the bezel and the acoustic retainer.

3. The in-vehicle microphone apparatus of claim 2, wherein
    the acoustic retainer is provided with a first sound collection port and a second sound collection port adjacent to each other, wherein
    the bezel is provide with a first through-hole directly facing the first sound collection port and a second through-hole directly facing the second sound collection port, and wherein
    the close-contact member includes
    a peripheral lip that is disposed on a peripheral edge of the acoustic retainer and that elastically deforms to be in close contact with the bezel, and
    a center lip that is disposed between the first sound collection port and the second sound collection port on the end surface of the acoustic retainer to extend from one side of the peripheral lip to another side opposite to the one side and that elastically deforms to be in close contact with the bezel.

4. The in-vehicle microphone apparatus of claim 3, wherein
    the acoustic retainer is further provided with
    a first sound passage communicating with the first sound collection port,
    a second sound passage communicating with the second sound collection port,
    a partition wall separating the first sound passage and the second sound passage and having a tip acting as a center lip,
    a communicating port that is an opening penetrating the partition wall and that allows communication between the first sound passage and the second sound passage, and wherein
    the partition wall has a thicker portion between the communicating port and the bezel compared to the other portion.

* * * * *